United States Patent
Bucur et al.

(10) Patent No.: US 10,069,141 B2
(45) Date of Patent: Sep. 4, 2018

(54) HYBRID SULFUR PARTICLES AND CATHODE ACTIVE MATERIALS CONTAINING THE HYBRID PARTICLES

(71) Applicant: Toyota Motor Engineering & Manufacturing North America, Inc., Erlanger, KY (US)

(72) Inventors: Claudiu B. Bucur, Ypsilanti, MI (US); John Muldoon, Saline, MI (US); Naoki Osada, Northville, MI (US); Mike Jones, Orchard Lake, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 183 days.

(21) Appl. No.: 14/983,763

(22) Filed: Dec. 30, 2015

(65) Prior Publication Data

US 2017/0194640 A1    Jul. 6, 2017

(51) Int. Cl.
| | | |
|---|---|---|
| *H01M 4/36* | (2006.01) | |
| *H01M 4/58* | (2010.01) | |
| *H01M 4/60* | (2006.01) | |
| *H01M 4/04* | (2006.01) | |
| *H01M 4/02* | (2006.01) | |

(52) U.S. Cl.
CPC ......... *H01M 4/366* (2013.01); *H01M 4/0497* (2013.01); *H01M 4/5815* (2013.01); *H01M 4/602* (2013.01); *H01M 2004/027* (2013.01); *H01M 2004/028* (2013.01); *H01M 2220/20* (2013.01)

(58) Field of Classification Search
CPC .. H01M 4/366; H01M 4/0497; H01M 4/5815; H01M 4/602; H01M 2004/027; H01M 2004/028; H01M 2220/20
See application file for complete search history.

(56) References Cited

U.S. PATENT DOCUMENTS

| | | | |
|---|---|---|---|
| 4,457,989 A | 7/1984 | Coetzer | |
| 5,919,587 A | 7/1999 | Mukherjee et al. | |
| 8,974,960 B2 | 3/2015 | Manthiram et al. | |
| 9,005,808 B2 | 4/2015 | Abouimrane et al. | |
| 2013/0164615 A1 | 6/2013 | Manthiram et al. | |
| 2014/0162121 A1 | 6/2014 | Ryu et al. | |
| 2014/0203469 A1 | 7/2014 | Liu et al. | |
| 2014/0234707 A1* | 8/2014 | Muldoon | H01M 4/622 429/211 |
| 2015/0221935 A1 | 8/2015 | Zhou et al. | |

FOREIGN PATENT DOCUMENTS

CN        104201355 A        12/2014

OTHER PUBLICATIONS

Abouimrane et al. "A New Class of Lithium and Sodium Rechargeable Batteries Based on Selenium and Selenium-Sulfur as a Positive Electrode"; Journal of the American Chemical Society, 134, pp. 4505-4508 (Feb. 25, 2012) (Year: 2012).*
Zhou et al. "Yolk-Shell Structure of Polyaniline-Coated Sulfur for Lithium-Sulfur Batteries"; Journal of the American Chemical Society, 135, pp. 16736-16743 (Oct. 10, 2013). (Year: 2013).*
Kotkata et al. "Structural studies of glassy and crystalline selenium-sulphur compounds"; Journal of Material Science, 27, pp. 1785-1794. (Year: 1992).*
Bucur et al. "Ultrathin tunable ion conducting nanomembranes for encapsulating of sulfur cathodes"; Energy and Environmental Science, 6, pp. 3286-3290 (Sep. 25, 2013). (Year: 2013).*

* cited by examiner

*Primary Examiner* — Gregg Cantelmo
(74) *Attorney, Agent, or Firm* — Oblon, McClelland, Maier & Neustadt, L.L.P.

(57) ABSTRACT

A hybrid particle having a core of a hybrid composite comprising at least two elements selected from the group consisting of sulfur, selenium and tellurium and a coating of at least one self-assembling polymeric layer encapsulating the core is provided. A method for preparing the hybrid particle includes mixing an aqueous solution of a polymer with an aqueous solution of a soluble precursor of at least two elements selected from the group consisting of sulfur, selenium and tellurium to form a mixture and adding an acid to the mixture to obtain the hybrid particle. A cathode having an active material of the hybrid particles and a battery containing the cathode are also provided.

16 Claims, 23 Drawing Sheets
(14 of 23 Drawing Sheet(s) Filed in Color)

HYBRID SULFUR PARTICLES AND CATHODE ACTIVE MATERIALS CONTAINING THE HYBRID PARTICLES

BACKGROUND

Field of the Disclosure

This disclosure is directed to hybrid sulfur particles useful as cathode active material in a metal ion battery. This disclosure is also directed to a cathode containing the hybrid sulfur particles and an electrochemical cell or battery containing the cathode.

Discussion of the Background

An ongoing objective in the commercial development of electric vehicles and portable electronics is to provide batteries with higher energy densities than currently available with state of the art lithium ion batteries. One approach in achievement of this objective is to couple a metal anode, such as lithium or magnesium, with a high capacity conversion cathode, such as sulfur or oxygen, without sacrificing cycle life and rate capability. Sulfur is highly attractive because it is economical, highly abundant and offers a charge capacity that is an order of magnitude higher than conventional insertion lithium ion cathodes. However, sulfur is electrically insulating and exhibits unacceptably high mass loss during cycling due to the formation of polysulfide reduction intermediates which are highly soluble in an electrolyte and do not return to the cathode during a recharge cycle.

Thus, although elemental sulfur has been under investigation as a cathode active material in conjunction with metal anodes for more than 50 years, in order to obtain viable commercial sulfur cathode energy storage and supply source, these two fundamental challenges must be overcome. The first challenge is to enhance the conductivity of elemental sulfur. Unlike commercial lithium ion cathodes ($LiCoO_2$) which possess a high electronic conductivity and do not require significant addition of conductive additives, sulfur is an effective insulator which is 1 billion times less conductive than $LiCoO_2$. Therefore, any cathode active material based on elemental sulfur must be enhanced with conductive additives.

The second challenge is to control the diffusion of polysulfide intermediates formed during cycling. During discharge, sulfur reduces in a stepwise manner by forming a series of polysulfide intermediates which are ionic in nature and solvate easily in the electrolyte. This causes mass loss of active material upon cycling. Even today, while approaches mitigate these fundamental challenges of low conductivity and dissolution of polysulfides, they also diminish the superior charge capacity of sulfur.

As indicated, one problem deriving from the insulating nature of sulfur is the need for high loadings of conductive additives to improve the overall electronic conductivity. This results in low sulfur content in the cathode and thus reduced energy capacity. A second problem is the slow rate of operation due to the low electronic conductivity of sulfur and the low ionic conductivity of the reduced product, $Li_2S$. Third, the diffusion of ionic polysulfides limits cycle life due to anode passivation and mass loss from the cathode.

Extensive research efforts have been devoted to developing methods to enhance the conductivity of elemental sulfur and to control the diffusion of polysulfide intermediates formed during cycling. Researchers have studied conductive hosts infused with sulfur and polymer-coated sulfur composites. Since the pioneering findings by Nazar who demonstrated the benefit of infusing sulfur into ordered mesoporous carbon, various micro/nano carbon hosts including spheres, nanofibers, graphene oxide and carbon paper, have been investigated as conductive hosts to contain the sulfur active material (Nazar et al. Nature Materials, 2009, 8, 500-506). Manthiram has recently demonstrated a microporous carbon interlayer with pore sizes matching the dimensions of the polysulfide ions (Manthiram et al. Nature Communications, 2012, 3, 1166). Tarascon infused sulfur into metal organic frameworks (MOF) with hopes of benefitting from interactions between the polysulfides and the MOF oxide surface (Tarascon et al. Journal of the American Chemical Society, 2011, 133, 16154-16160). While these approaches improve the conductivity of the sulfur cathode, they are still plagued by diffusion of polysulfides out of the host pores which limits cycle life. In 2012, Amine obtained a $SeS_2$ carbon nanotube composite starting from commercially available $SeS_2$ delivering 512 mAh/g at 50 mA/g after 30 cycles (Amine et al. Journal of the American Chemical Society, 2012, 134, 4505-4508). Various composites of $SeS_y$ (y=2 or 7) carbon nanotube composites have been prepared and evaluated. The discharged capacities varied from 571 to 833 mAh/g at 50 mA/g after 50 cycles. In addition, Li et al. have explored the preparation of Se/S composites infused into porous carbon which delivers capacities of 910 mAh/g at 1 A/g over 500 cycles (Li et al. Energy and Environmental Science, 2015, 8, 3181-3186).

In U.S. application Ser. No. 14/489,597, filed Sep. 18, 2014, the present research group has described novel encapsulated sub-micron sulfur particles formed in the presence of a mixed hydrophilic/hydrophobic copolymer. The resulting encapsulated sulfur sub-micron core particle is coated with a membrane of layers of self-assembling conductive polymer layers, each successive layer having a charge opposite to the previous layer.

However, the major disadvantage of all these approaches is that they require a carbon matrix to enhance conductivity of the active material and thus dilutes the sulfur capacity of the cathode.

Thus, an object of the present disclosure is to provide a sulfur particle having a balance of high capacity and good conductivity which is suitable for utility as a cathode active material.

A second object of the disclosure is to provide a cathode containing the particle as an active material which is suitable for utility in a battery having high capacity and high cycle lifetime.

A third object of the disclosure is to provide a battery which has sufficient capacity and lifetime to be a viable energy source for a vehicle.

SUMMARY OF THE DISCLOSURE

These and other objects have been achieved by the present disclosure, the first embodiment of which includes a hybrid particle, comprising: a core of a hybrid composite comprising at least two elements selected from the group consisting of sulfur, selenium and tellurium; and a coating of at least one self-assembling polymeric layer encapsulating the core.

In an aspect the hybrid particles of the first embodiment comprise elemental sulfur and at least one of selenium and tellurium.

In a further aspect of the first embodiment the present provides a hybrid particle wherein the core comprises elemental sulfur and elemental selenium, a content of sulfur is from greater than 50% to less than 100% by weight of the core, and a content of the elemental selenium is from greater than 0% to less than 50% by weight of the core.

In another aspect of the first embodiment, the present invention provides a hybrid particle, wherein the core comprises elemental sulfur and elemental tellurium, a content of sulfur is from greater than 50% to less than 100% by weight of the core, and a content of the elemental tellurium is from greater than 0% to less than 50% by weight of the core.

In another embodiment, the present invention provides a method for preparing the hybrid particle of the first embodiment, comprising: mixing an aqueous solution of a self-assembling polymer with an aqueous solution of a soluble precursor of at least two elements selected from the group consisting of sulfur, selenium and tellurium to form a mixture; and adding an acid to the mixture to obtain the hybrid particle.

In another preferred embodiment, the present disclosure provides a cathode comprising the particles of any of the embodiments according to the present disclosure as an active material and in a further preferred embodiment the present disclosure includes a battery comprising the cathode.

The present disclosure also includes a vehicle containing the battery according to the embodiments of the disclosure.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

DETAILED DESCRIPTION OF THE DISCLOSURE

Figure 1:
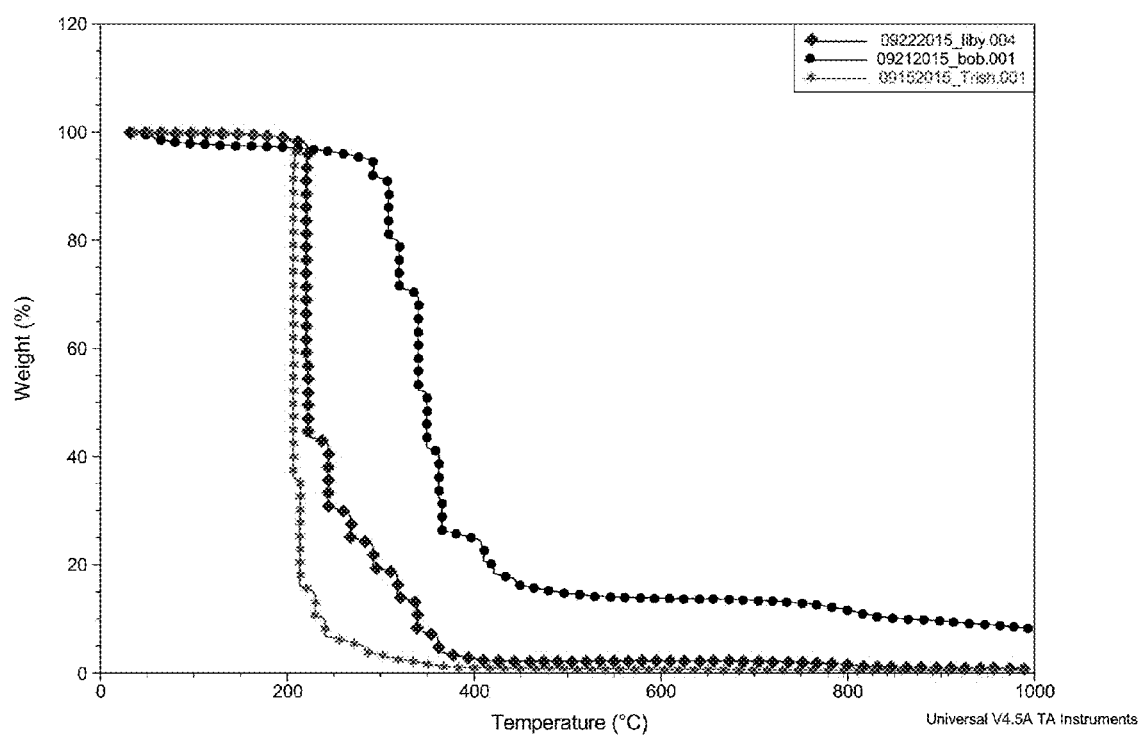
FIG. 1 shows a TGA analysis of the hybrid materials prepared in the Examples.

Within the description of this disclosure, all cited references, patents, applications, publications and articles that are under authorship, joint authorship or ascribed to members of the Assignee organization are incorporated herein by reference. Where a numerical limit or range is stated, the endpoints are included. Also, all values and subranges within a numerical limit or range are specifically included as if explicitly written out. As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. According to the present disclosure, the term "chalcogen core" refers to a core containing at least one of elemental sulfur, elemental selenium and elemental tellurium. As used herein, the term "vehicle" refers to any power driven device designed for transportation including an automobile, truck van, bus, golf cart and other utility forms of transportation.

The inventors are directing effort and resources to the study of materials useful to produce a battery of sufficient capacity and cycle lifetime to be competitive with and replace a combustion engine as a power source as well as other utilities requiring a high capacity, high cycle lifetime battery. In addition, a battery suitable for large scale intermittent energy storage will also be important for storage of green energy such as provided by wind and solar generation methods.

In order to achieve this goal, the inventors have studied methods to address and overcome the disadvantages of sulfur described above. As previously indicated, stabilization of a sulfur core sub-micron particle to loss of soluble sulfur reduction products is disclosed in copending U.S. application Ser. No. 14/489,597, filed Sep. 18, 2014, wherein the particles are encapsulated in a membrane of layers of self-assembling conductive polymer layers, each successive layer having a charge opposite to the previous layer. However, to be sufficiently conductive the sulfur core contains embedded conductive carbon particles and the inventors have studied other technologies that may increase conductivity while at the same time maintain or enhance the electrical capacity of the particle.

One approach to simultaneously improve conductivity while maintaining or even improving capacity is based on the study and utility of atoms having the same electronic outer shell configuration as sulfur and yet having greater conductivity. The inventors noted that the electrical conductivities for tellurium and selenium are 5 S/cm and $1\times10^{-6}$ S/cm, respectively, while in comparison the conductivity of sulfur is $5\times10^{18}$ S/cm. As chalcogen like sulfur both selenium and tellurium offer the possibilty of increased conductivity. In addition, and importantly, tellurium and selenium both have higher elemental densities than sulfur and therefore, have a volume charge capacity of the same magnitude as sulfur. Thus the inventors have discovered that preparing composite hybrid sub-micron particles containing at least two elements selected from sulfur, selenium and tellurium provides a cathodic active material having increased electrical conductivity over elemental sulfur while maintaining, if not improving, the charge capacity available.

Thus in a first embodiment the present invention provides a hybrid particle, comprising: a core of a hybrid composite material comprising at least two elements selected from the group consisting of sulfur, selenium and tellurium; and a coating of at least one self-assembling polymeric layer encapsulating the core.

The inventors have discovered that by preparing hybrid composite particles containing hybrid composites of sulfur and at least one of selenium and tellurium an active material useful for a cathode are obtained. Moreover, the hybrid particles may be functional without inclusion of conductive carbon materials or with inclusion of minimum amount of conductive carbon within the core.

Thus, the first embodiment of the present disclosure provides a hybrid particle, comprising: a core of a hybrid composite comprising at least two elements selected from the group consisting of sulfur, selenium and tellurium; and a coating of at least one self-assembling polymeric layer encapsulating the core.

In one preferred aspect of the first embodiment the hybrid particles comprise elemental sulfur and at least one of selenium and tellurium. The inventors have discovered that by a method of coprecipitation of the elemental components from soluble precursors, intimate and homogeneous composites may be formed. The homogeneity of the composites is shown in the EDS layered images shown in FIGS. 4, 14 and 22 for the hybrid particles prepared in the Examples. The inventors believe that in addition to homogeneous composite of the respective elements, composite molecules of the elements may also be formed in the coprecipitation process. Support for the formation of composite molecules may be provided by the Raman spectra shown in FIGS. 11, 19 and 27, where absorption bands different from those of the pure elements are observed. Although not wishing to be constrained by theory, the inventors speculate that since chalconide elements are known to form elemental ring structures such as $S_8$ or $Se_8$ rings, composite rings such as $S_7Se$, $S_6Se_2$ or the like may be formed at least in part.

In consideration of relative economics of sulfur, selenium and tellurium, composites containing a majority content of sulfur may be preferred.

Thus, in one preferred aspect, hybrid particles are provided wherein the core comprises elemental sulfur and elemental selenium, a content of sulfur is from greater than 50% to less than 100% by weight of the core, and a content of the elemental selenium is from greater than 0% to less than 50% by weight of the core. In a further aspect the content of the elemental sulfur may be from 90% to less than 100% by weight of the core, and the content of the elemental selenium may be from greater than 0% to less than 10% by weight of the core.

In similar aspect, the present invention provides a hybrid particle as described above, wherein the core comprises elemental sulfur and elemental tellurium, a content of sulfur may be from greater than 50% to less than 100% by weight of the core, and a content of the elemental tellurium may be from greater than 0% to less than 50% by weight of the core. In a further aspect the content of the elemental sulfur may be from 90% to less than 100% by weight of the core, and the content of the elemental tellurium may be from greater than 0% to less than 10% by weight of the core.

According to the present disclosure the particles can be generated in situ by precipitation from an aqueous solution of a soluble precursor of at least one element selected from the group consisting of sulfur, selenium and tellurium, in the presence of specific polymers which encapsulate the hybrid particles as they are formed.

The particle size of the composite hybrid core may be from 0.01 to 1 micron, preferably from 0.1 to 0.5 micron.

Sulfur particles may be formed from the reaction of sodium thiosulfate with an acid, such as hydrochloric acid, as indicated in the following chemical equation:

$$Na_2S_2O_3 + 2HCl \rightarrow 2NaCl + SO_2\uparrow + S\downarrow + H_2O$$

The acid may be selected from the group consisting of hydrochloric acid, oxalic acid, ascorbic acid, concentrated sulfuric acid, nitric acid, methanesulfonic acid and a mixture thereof. For example, a 3:1 mixture (based on the total volume of the acid mixture) of concentrated sulfuric acid and nitric acid may be used. The particles obtained according to the present disclosure provide a composite hybrid material having high energy density. In specific aspects, hybrid particles having a sulfur content greater than 95% by weight may be prepared.

A soluble precursor of at least one of selenium and tellurium is of a formula (I):

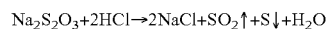

$$Na_2SSe_mTe_nO_3 \quad (I)$$

where m and n range from 0 to 1, and a sum of m and n is 1.

For example, a soluble precursor for selenium may be $Na_2SSeO_3$. The soluble precursor of formula (I) may be prepared by refluxing sodium sulfite with elemental selenium and/or elemental tellurium in water. Treating the soluble precursor of selenium and/or tellurium with an acid, in a reaction similar to the above equation for $Na_2S_2O_3$, may form a core comprising sulfur, selenium and/or tellurium.

The disclosure is not limited to the particular chemistry described and any method to form and precipitate chalcogen elements in the presence of polymers which contain hydrophobic and hydrophilic domains may be employed. The structure of the polymers governs the growth of hydrophobic core near the hydrophobic domains. For example, the polymer backbone rearranges in the hydrophilic medium (usually aqueous solutions) to form enclosed structures, such as spheres/cubes, rhomboids, hexagons and etc., which encapsulates the elemental hybrid composites.

An example of a polymer having hydrophobic and hydrophilic domains is a polymer salt of poly(3,4-ethylenedioxythiophene) (PEDOT) and polystyrene sulfonate (PSS). Other non-limiting examples of polymers that may be utilized include poly(3,4-ethylenedioxythiophene) polystyrene sulfonate (PEDOT:PSS), polyvinylpyrrolidone (PVP), polyaniline (PANI), poly(ethylene oxide) (PEO), carboxymethyl cellulose (CMC), sodium carboxymethylcellulose (NaCMC), polymethacrylic acid (PMA), [poly(2-acrylamido-2-methyl-1-propanesulfonic acid)] (PAMPA), branched polyethylenimine (bPEI), and poly(diallyldimethylammoniumchloride) (PDAD).

In a further embodiment, the present disclosure provides an electrode, preferably a cathode containing the hybrid particles. The cathode may be prepared by mixing the particles according to the above description with one or more binders and other materials conventionally employed to prepare a cathode structure. These materials may be mixed as a slurry, coated onto a metal foil, and dried. The methods of construction of a cathode employing an active material are conventionally known and any such method that is compatible with the particles of the disclosure may be employed.

A novel method to prepare a dense slurry of high sulfur loading is disclosed in a copending application to be filed with the present application.

Suitable binders known to one of ordinary skill which are chemically stable in the potential window of use of the cell may include thermoplastics and thermosetting resins. For example, polyethylene, polypropylene, polytetrafluoroethylene (PTFE), polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper.

The cathode thus prepared may be employed in the construction of an electrochemical cell or battery in a conventionally known manner. In a preferred embodiment the cathode may be combined with an anode having a metal as an active material. The metal may be an alkali metal including lithium or sodium or an alkaline earth metal including magnesium.

In one embodiment the present disclosure provides a battery comprising a metal anode and a cathode comprising the hybrid particles according to the present disclosure. The metal may be selected from the alkali metals, alkaline earth metals or other metals suitable for utility in metal ion batteries. in a preferred aspect, the metal may be lithium or magnesium.

Nonaqueous solvents suitable as an electrolyte include cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate include dimethyl carbonate, diethyl carbonate and methyl ethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethylene glycol dimethyl ether.

In one preferred embodiment the battery is a lithium ion battery and the lithium electrolyte ion or mobile ion carrier may be any conventionally known to one of skill in the art and may include one or more of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$.

In further embodiments the present disclosure includes a vehicle containing the battery according to the present disclosure wherein the vehicle includes an automobile, truck van, bus, golf cart and other utility forms of transportation.

Having generally described this disclosure, a further understanding can be obtained by reference to certain specific examples which are provided herein for purposes of illustration only and are not intended to be limiting unless otherwise specified.

EXAMPLES

Preparation of Sulfur/Selenium Hybrid-I (0.6 g Se)

A mixture of 12 g of sodium sulfite and 0.6 g selenium in 80 ml water was heated to boiling and refluxed and stirred for a minimum of 3 hours to prepare a $Na_2SeSO_3$ solution. The solution was then combined with 50 g $Na_2S_2O_3$ and 5 ml of a 1% solution of conductive grade PEDOT:PSS (purchased from Aldrich) in a 3.5 liter volume of water and mixed under vigorous stirring to prepare the hybrid precursor solution.

The hybrid particles were then formed by rapid acidification of the hybrid precursor solution. The acidification was accomplished by rapid addition of 80 ml of a Ketjen black acid slurry or by addition of oxalic acid. The acidified mixture was stirred vigorously for 24 hours and the color of the mixture turned from black to beige. The particulate material that formed was separated from the mother liquors, washed with distilled water and dried.

A TGA analysis of the sample is shown in FIG. 1 (sample Trish).

Figure 2:
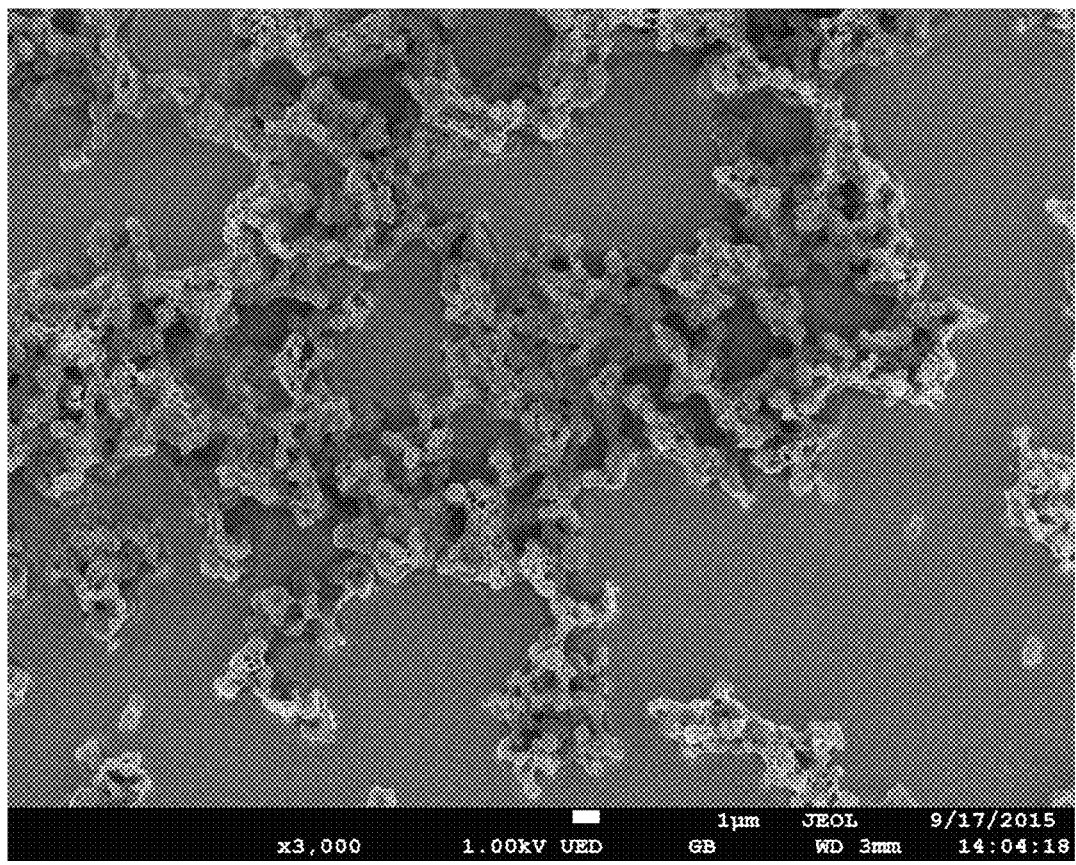
FIG. 2 shows a SEM image of the hybrid particles prepared in Example (I).

FIG. 2 shows a SEM image of the hybrid particles obtained.

Figure 3:
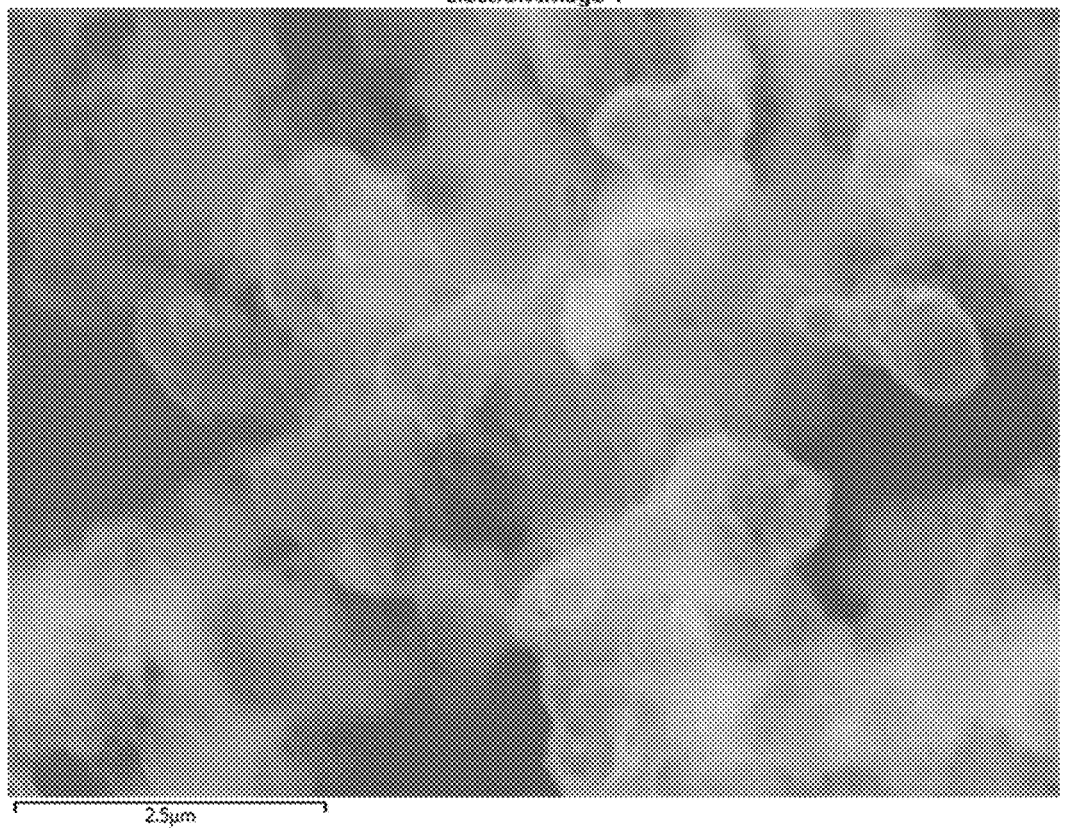
FIG. 3 shows an EDS image of the hybrid particles prepared in Example (I).
Figure 4:
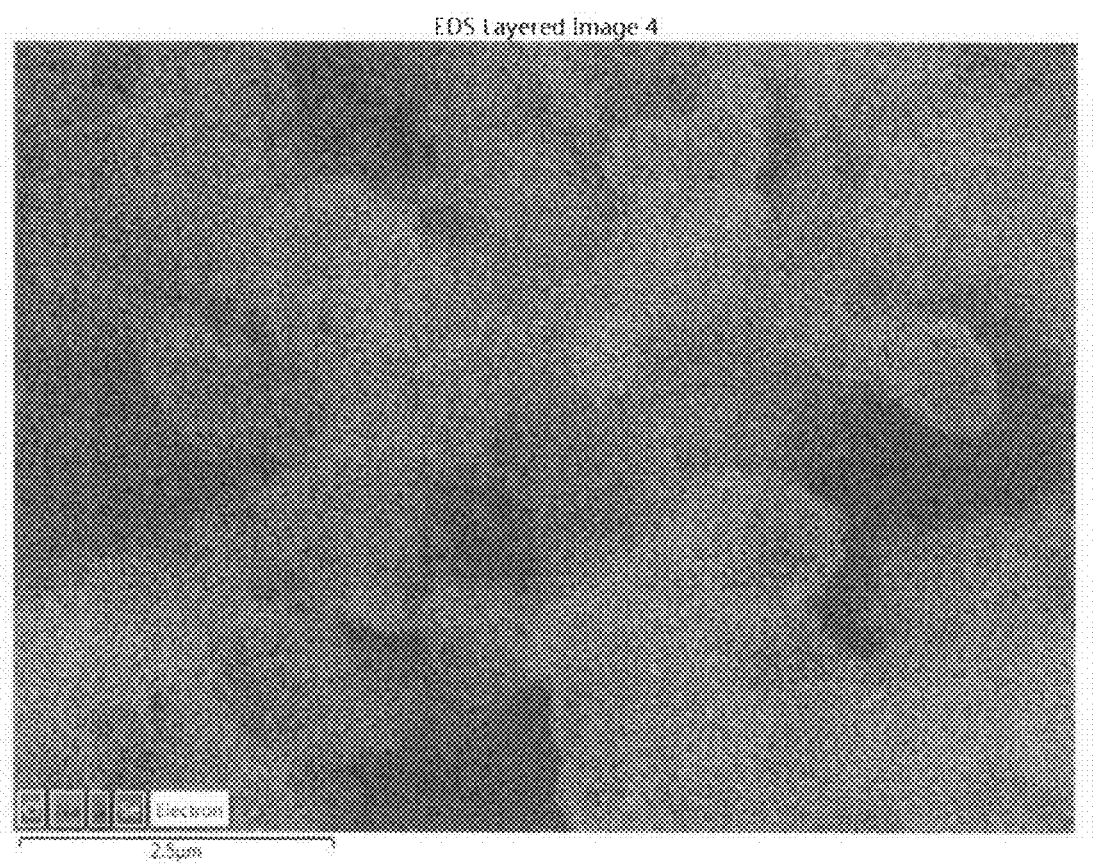
FIG. 4 shows a EDS layered image of the hybrid particles prepared in Example (I).
Figure 5:
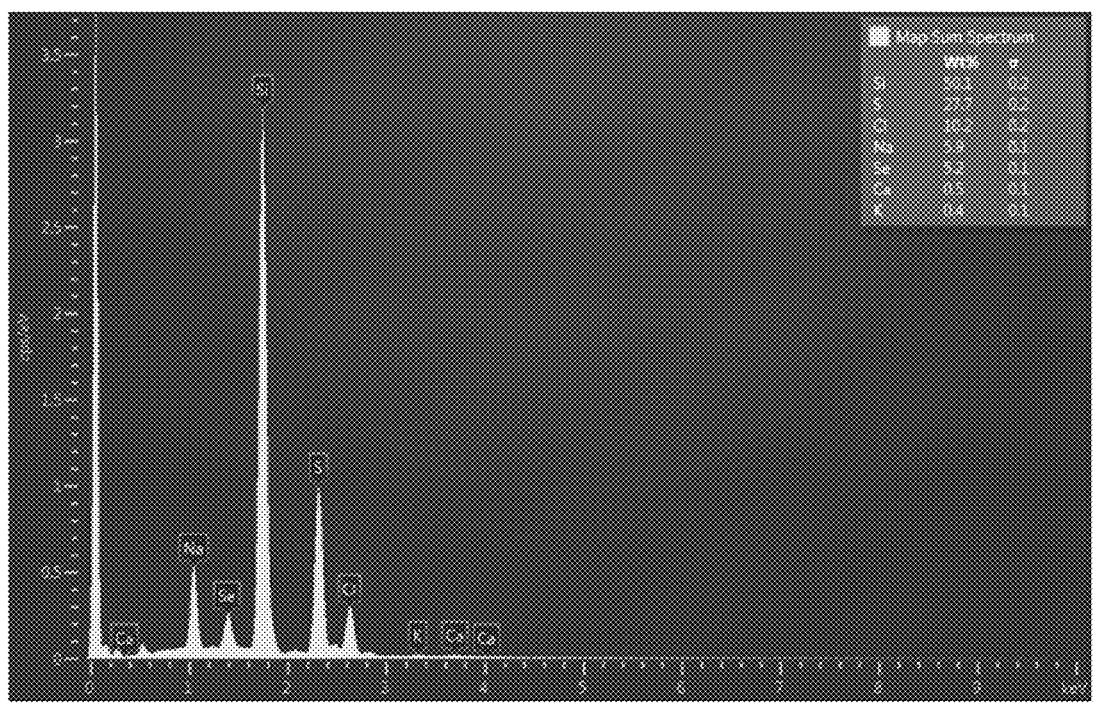
FIG. 5 shows a mapping of the sum of the wt % content of elements of the hybrid particles prepared in Example (I).
Figure 6:
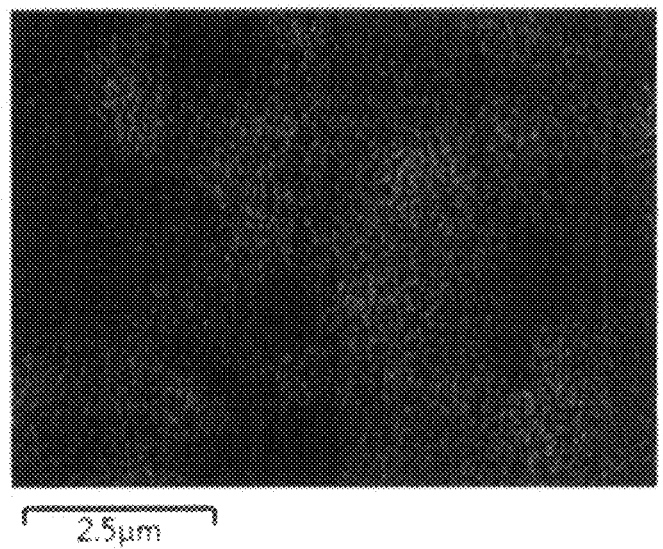
FIG. 6 shows a EDS layered image for sulfur of the hybrid particles prepared in Example (I).
Figure 7:
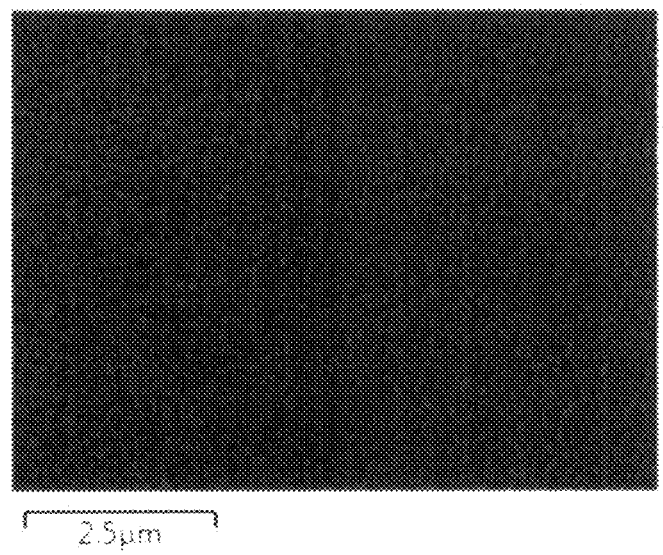
FIG. 7 shows a EDS layered image for selenium of the hybrid particles prepared in Example (I).
Figure 8:
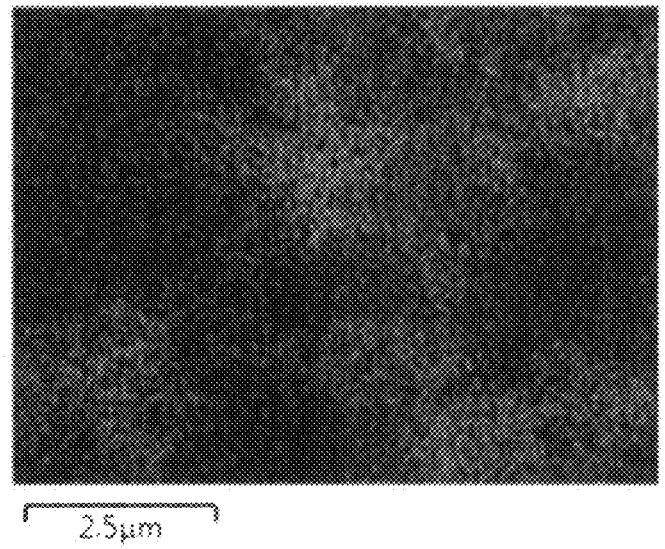
FIG. 8 shows a EDS layered image for sodium of the hybrid particles prepared in Example (I).
Figure 9:
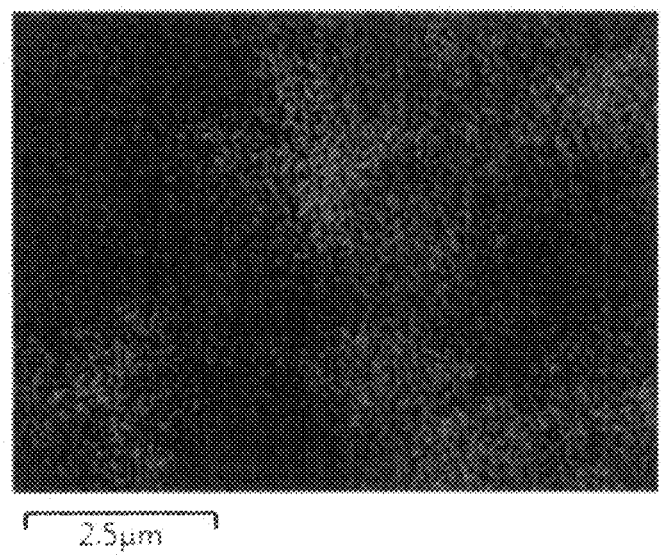
FIG. 9 shows a EDS layered image for chlorine of the hybrid particles prepared in Example (I).

FIG. 3 shows an EDS image of the hybrid particles and FIG. 4 shows a EDS layered image showing the distribution (color image) of Na, S, Se and Cl in the hybrid particle. FIG. 5 shows a mapping of the sum of the wt % content of elements within the particles. FIGS. 6-9 (color images) show the individual image distribution for S, Se, Na and K respectively.

Figure 10:
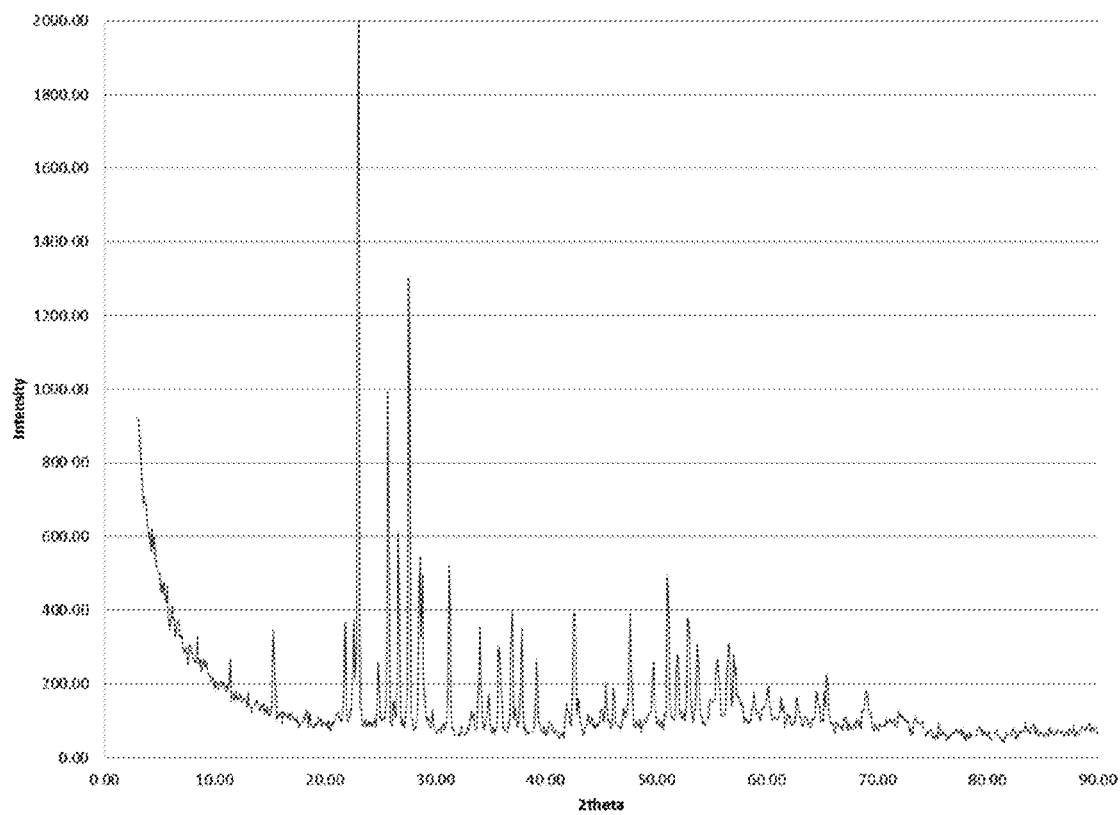
FIG. 10 shows a XRD analysis of the hybrid particles prepared in Example (I).

FIG. 10 shows a XRD spectrum of the hybrid particle material.

Figure 11:
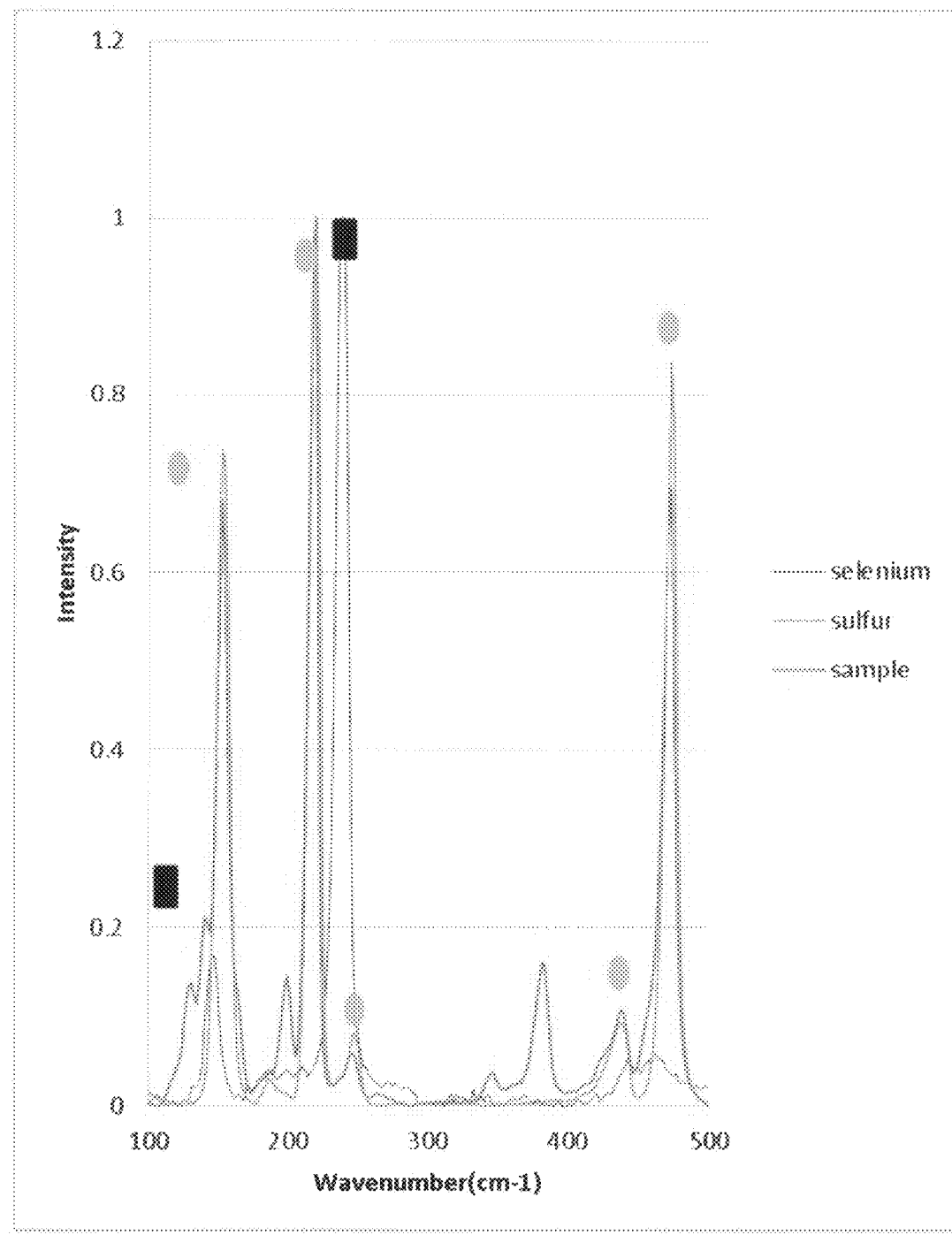
FIG. 11 shows a Raman spectrum of the hybrid particles prepared in Example (I).

FIG. 11 shows a Raman spectrum of the hybrid particle material.

Preparation of Sulfur/Selenium Hybrid-II (1.2 g Se)

The procedure described above in I was repeated with the exception that 1.2 g Se was used in place of 0.6 g.

A TGA analysis of the sample is shown in FIG. 1 (sample Liby).

Figure 12:
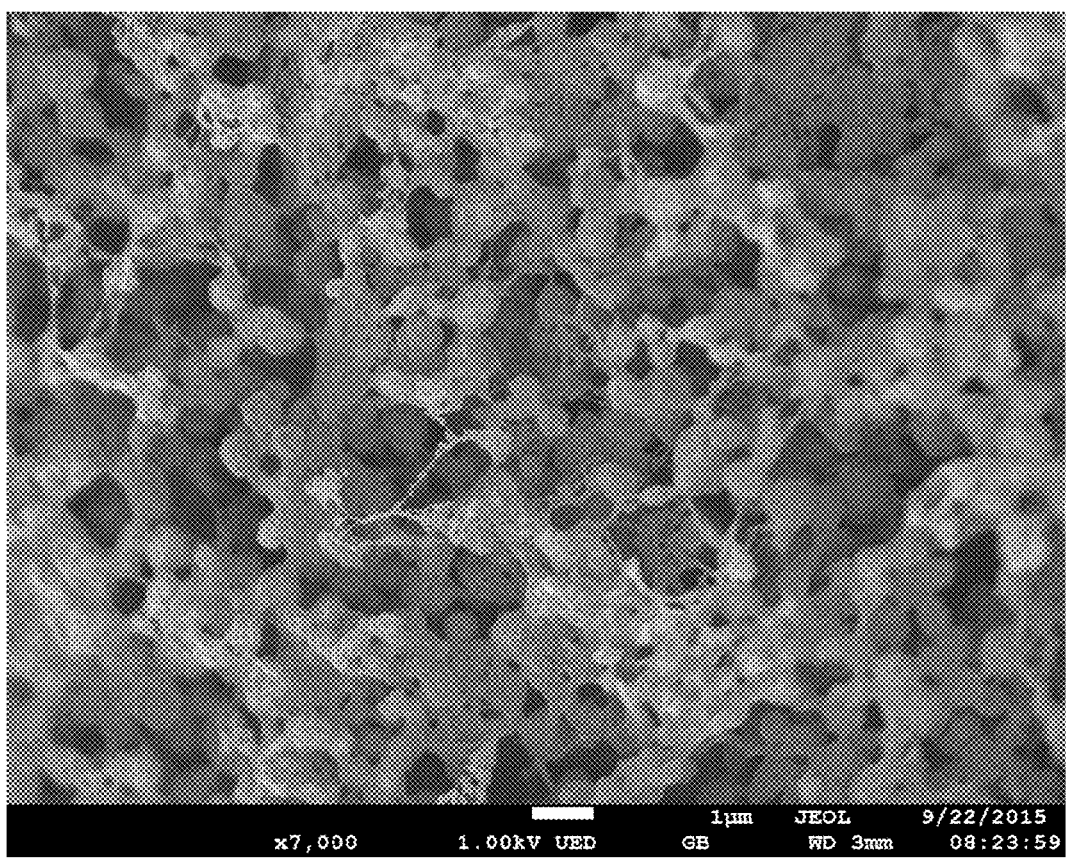
FIG. 12 shows a SEM image of the hybrid particles prepared in Example (II).

FIG. 12 shows a SEM image of the hybrid particles obtained.

Figure 13:
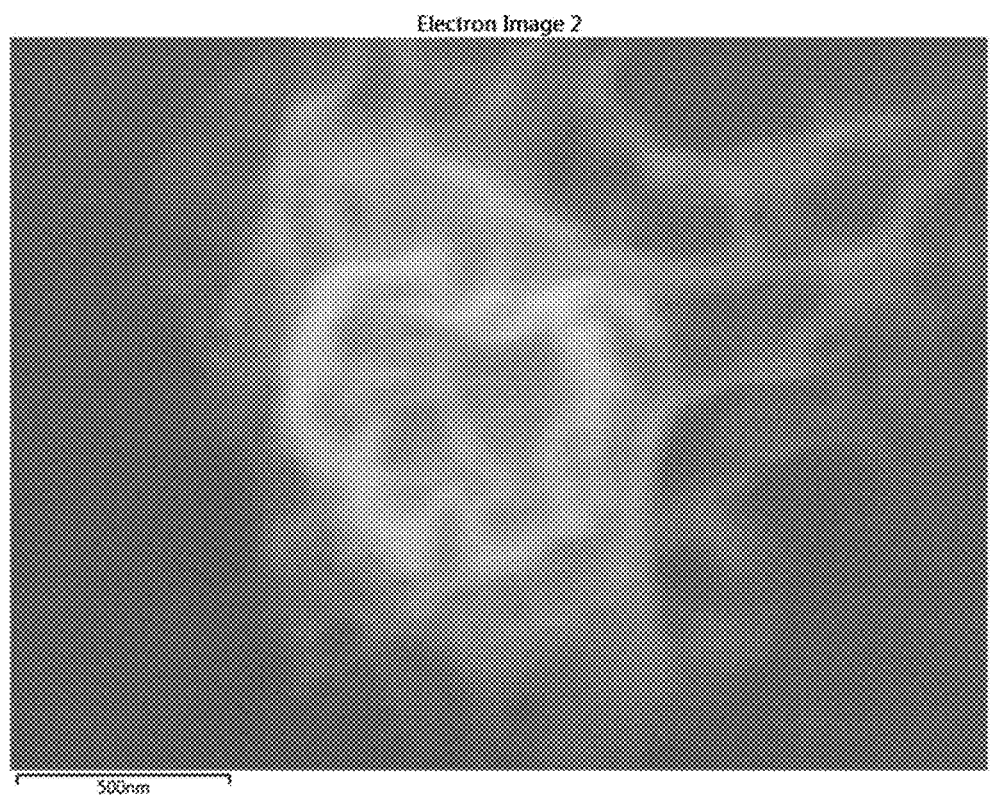
FIG. 13 shows an EDS image of the hybrid particles prepared in Example (II).
Figure 14:
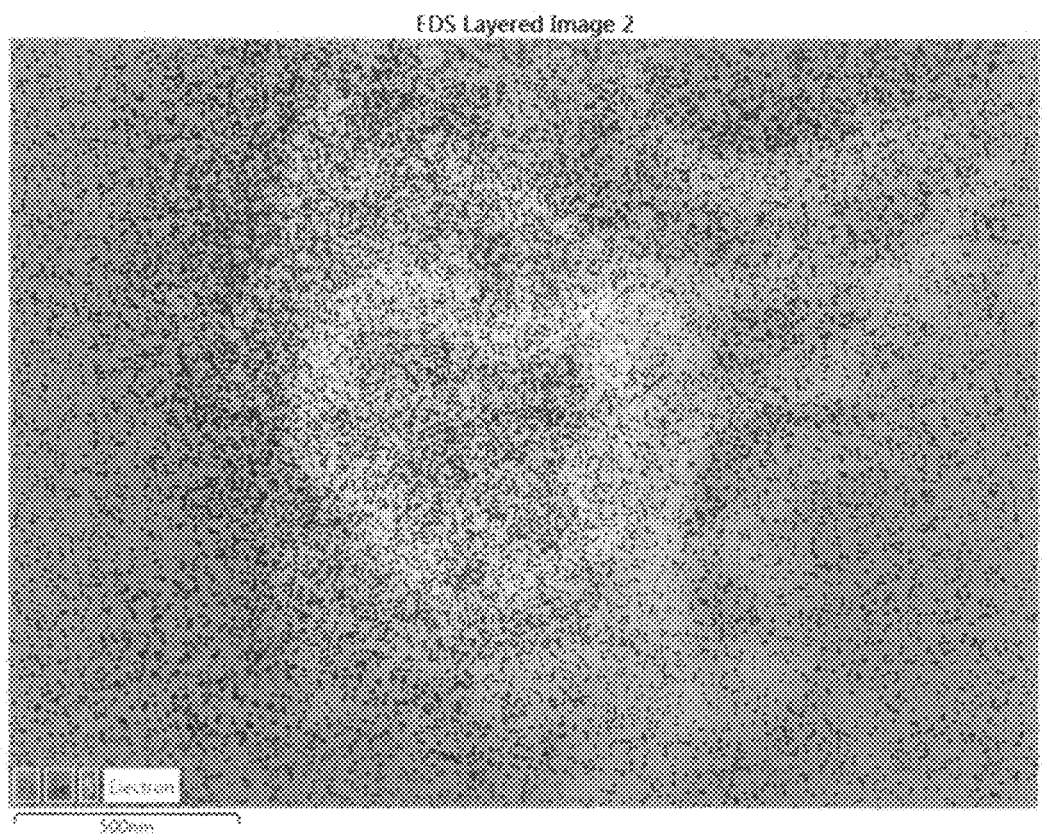
FIG. 14 shows a EDS layered image of the hybrid particles prepared in Example (II).
Figure 15:
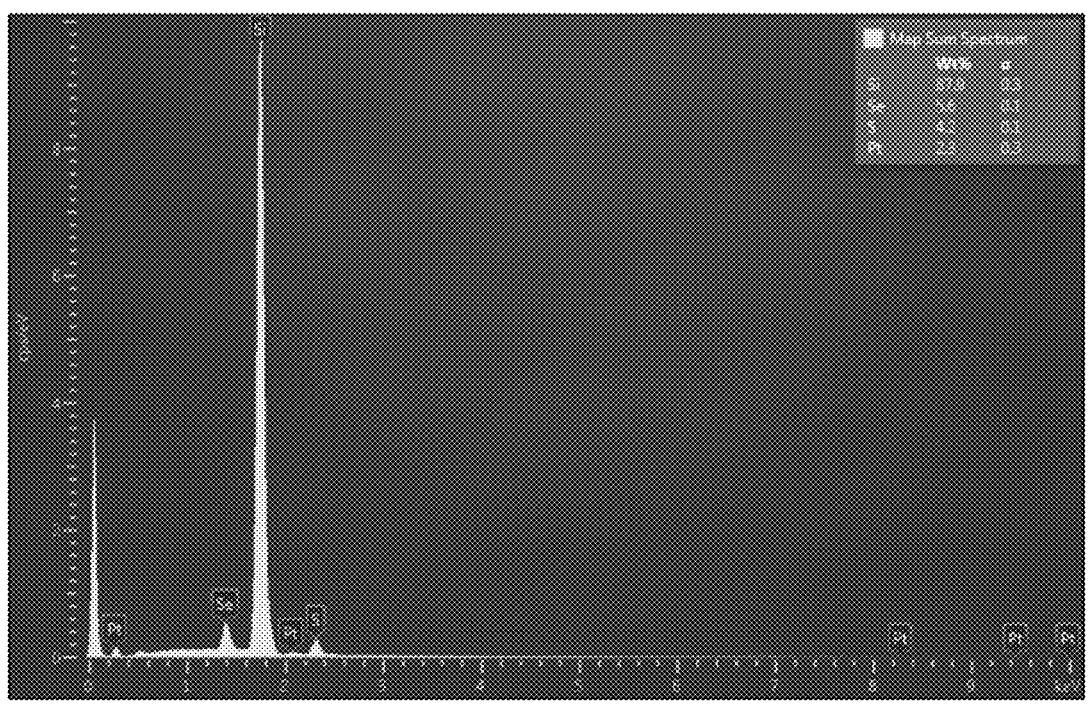
FIG. 15 shows a mapping of the sum of the wt % content of elements of the hybrid particles prepared in Example (II).
Figure 16:
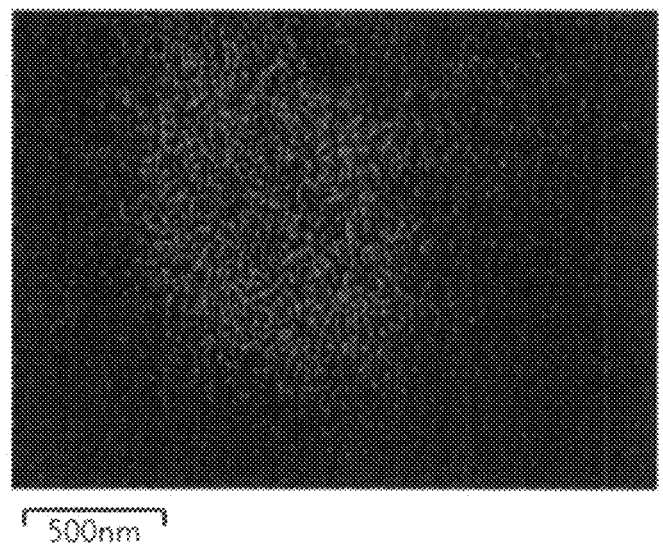
FIG. 16 shows a EDS layered image for selenium of the hybrid particles prepared in Example (II).
Figure 17:
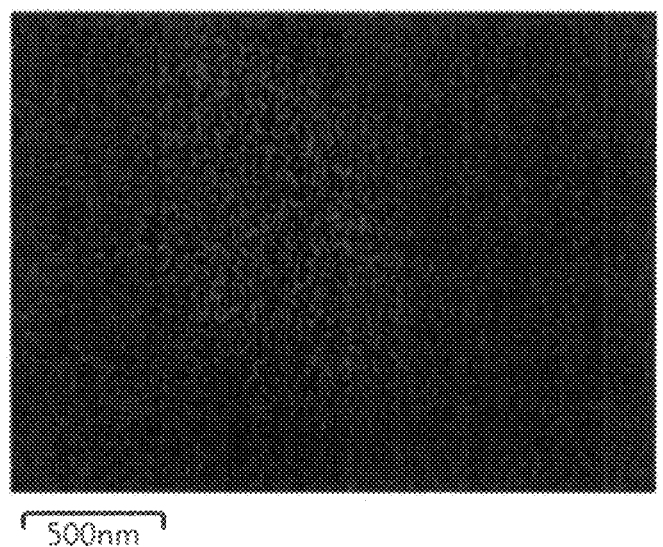
FIG. 17 shows a EDS layered image for sulfur of the hybrid particles prepared in Example (II).

FIG. 13 shows an EDS image of the hybrid particles and FIG. 14 shows a EDS layered image showing the distribution (color image) of S and Se in the hybrid particle. FIG. 15 shows a mapping of the sum of the wt % content of elements within the particles. (Pt was present due to Pt sputtering of the sample for analysis.) FIGS. 16-17 (color images) show the individual image distribution for Se and S respectively.

Figure 18:
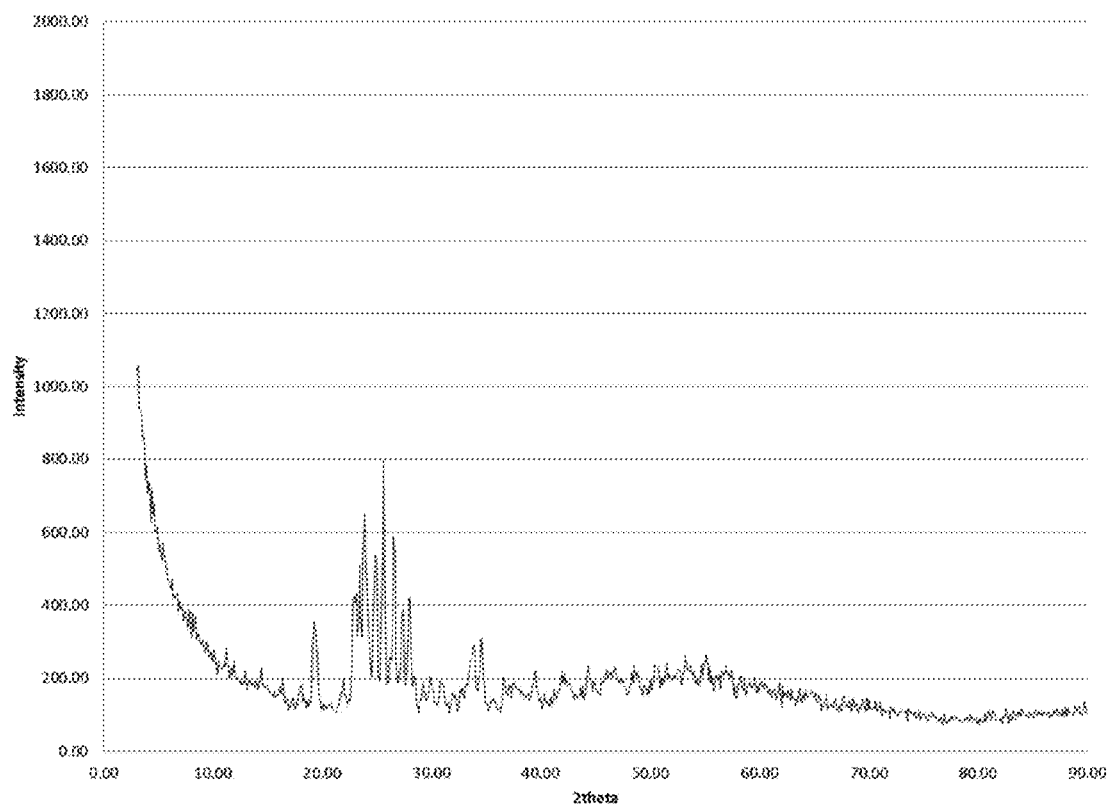
FIG. 18 shows a XRD analysis of the hybrid particles prepared in Example (II).

FIG. 18 shows a XRD spectrum of the hybrid particle (II) material.

Figure 19:
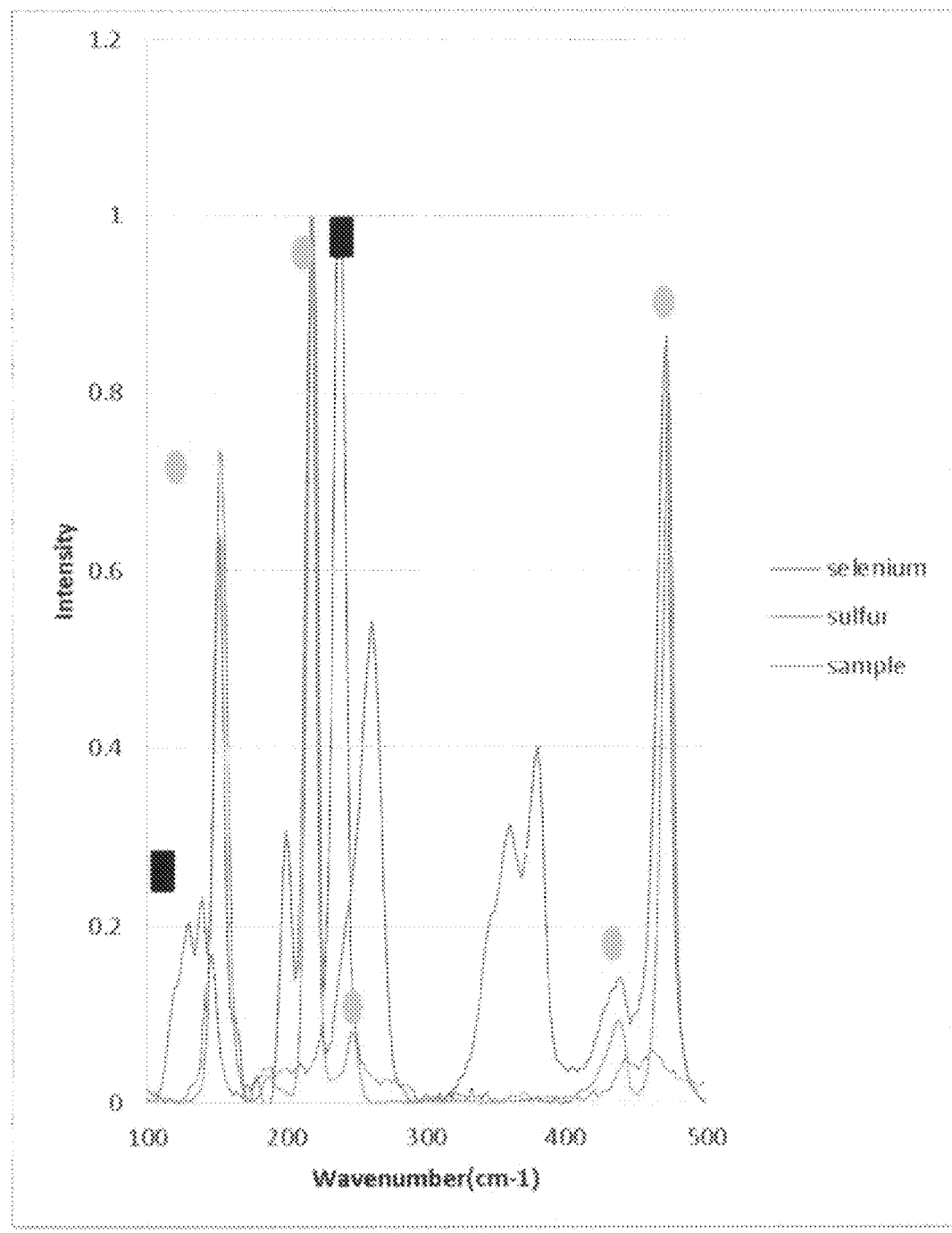
FIG. 19 shows a Raman spectrum of the hybrid particles prepared in Example (II).

FIG. 19 shows a Raman spectrum of the hybrid particle (II) material.

Preparation of Sulfur/Selenium Hybrid-III (6.0 g Se)

The procedure described above in I was repeated with the exception that 6.0 g Se was used in place of 0.6 g.

A TGA analysis of the sample is shown in FIG. 1 (sample bob).

Figure 20:
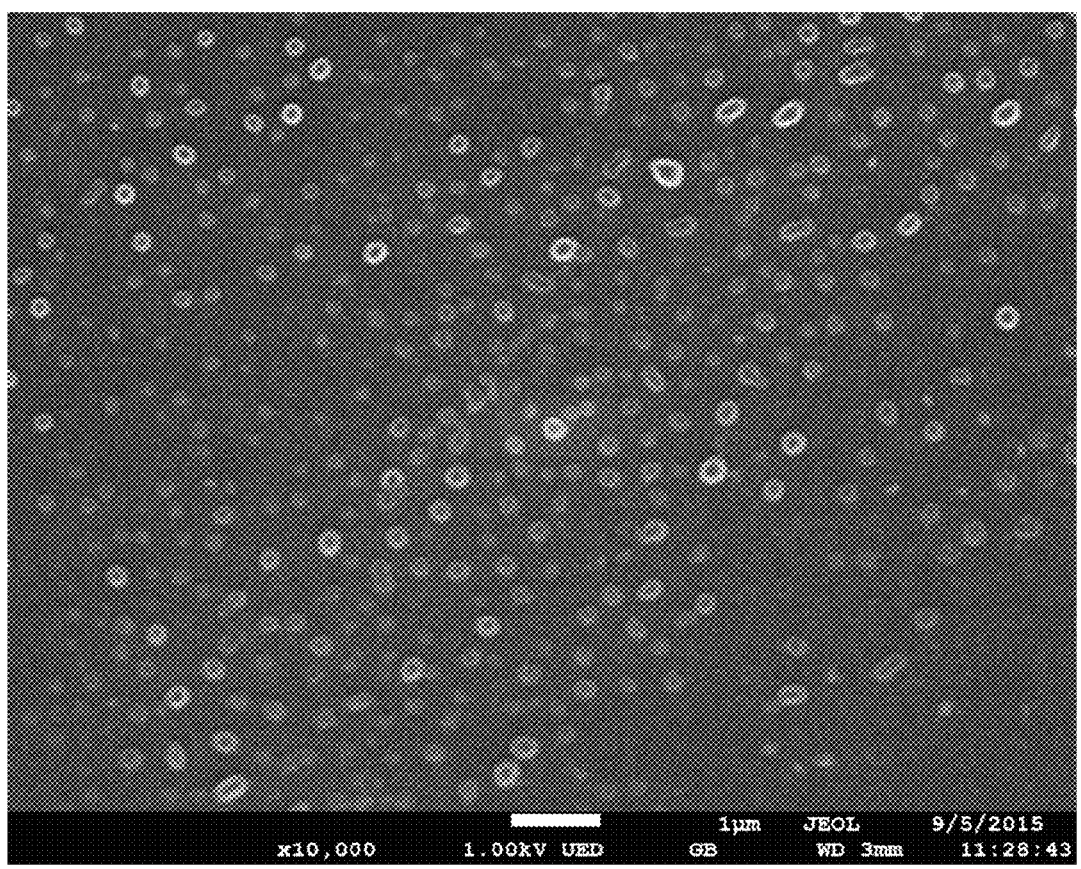
FIG. 20 shows a SEM image of the hybrid particles prepared in Example (III).
Figure 21:
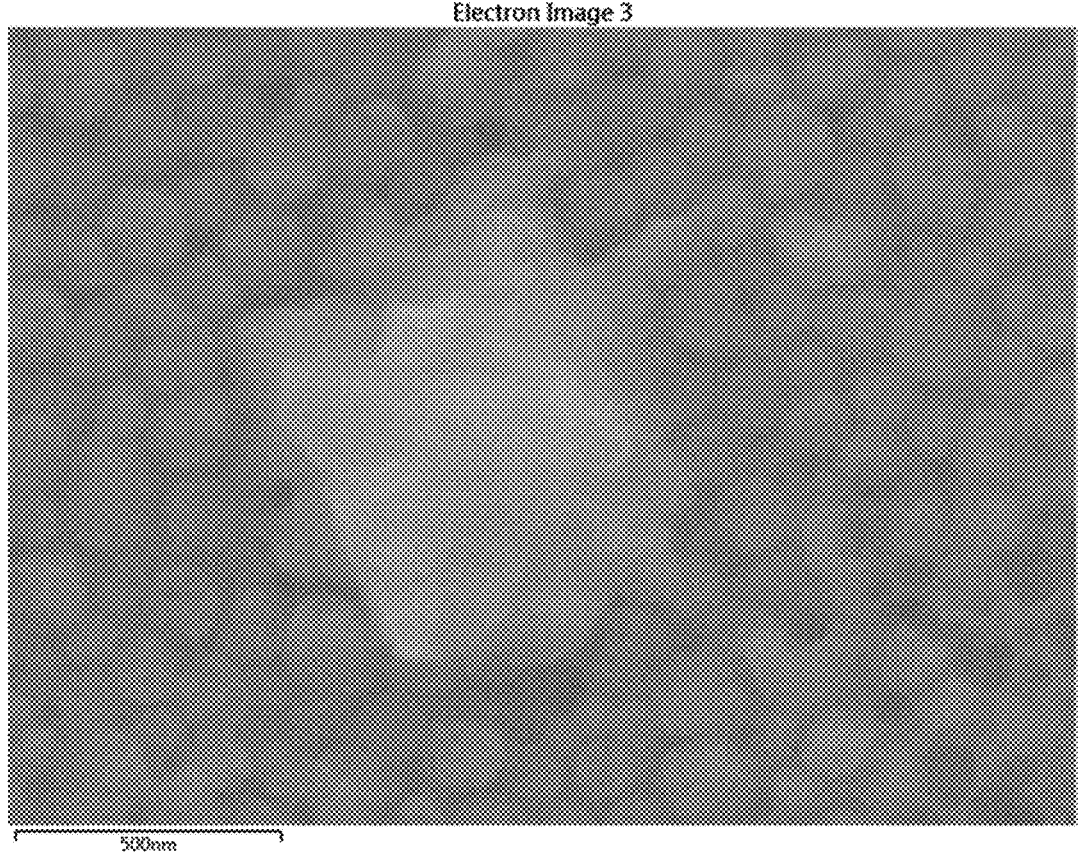
FIG. 21 shows an EDS image of the hybrid particles prepared in Example (III).
Figure 22:
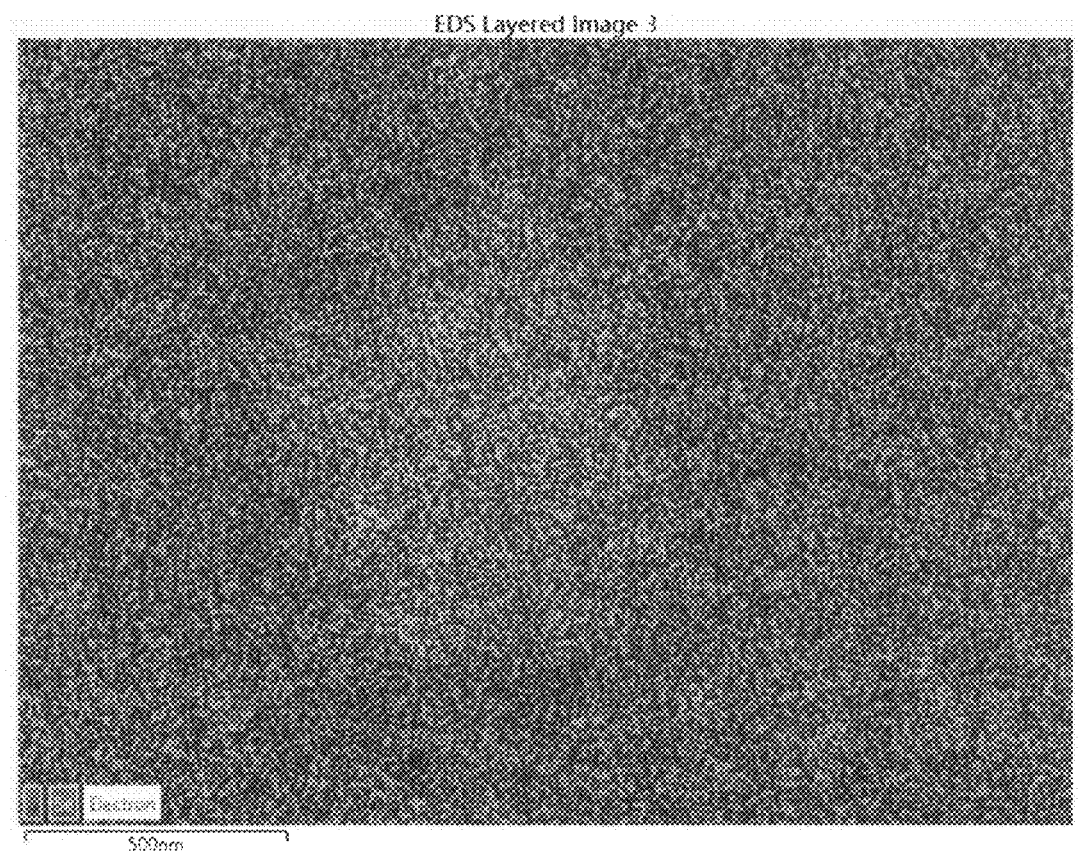
FIG. 22 shows a EDS layered image of the hybrid particles prepared in Example (III).
Figure 23:
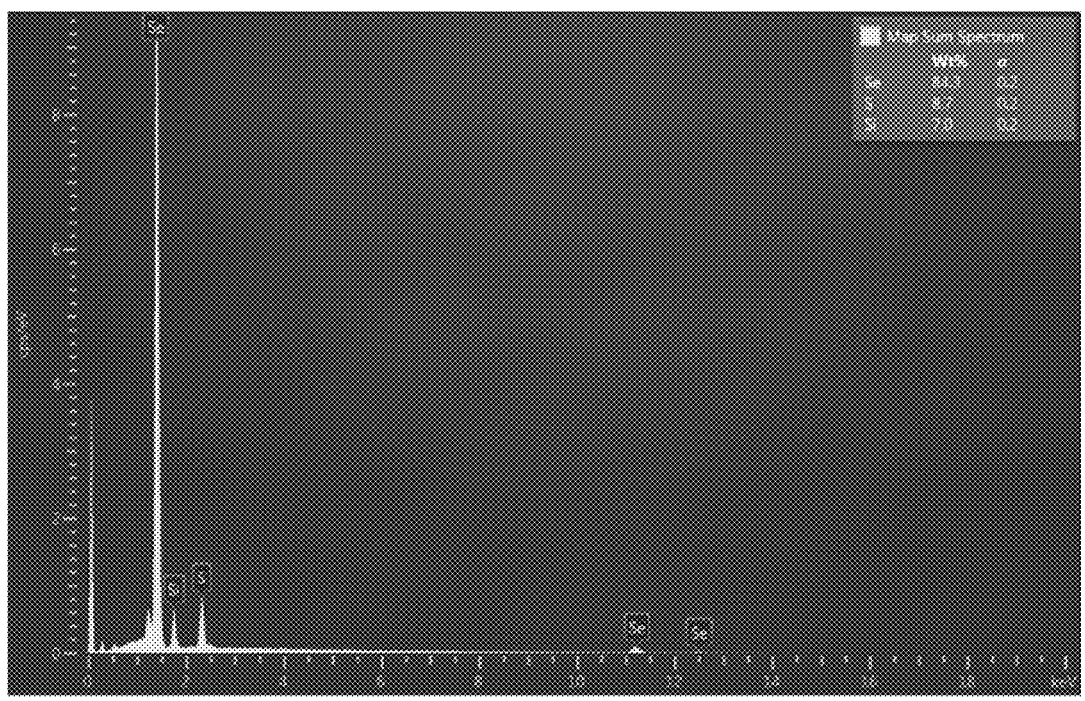
FIG. 23 shows a mapping of the sum of the wt % content of elements of the hybrid particles prepared in Example (III).
Figure 24:
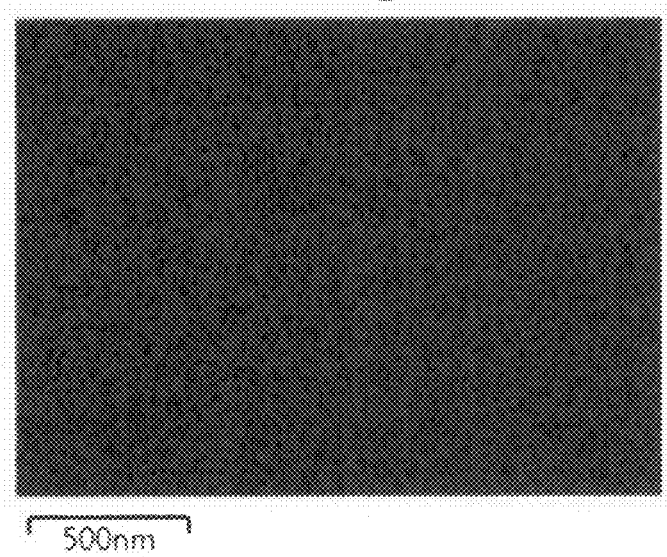
FIG. 24 shows a EDS layered image for selenium of the hybrid particles prepared in Example (III).
Figure 25:
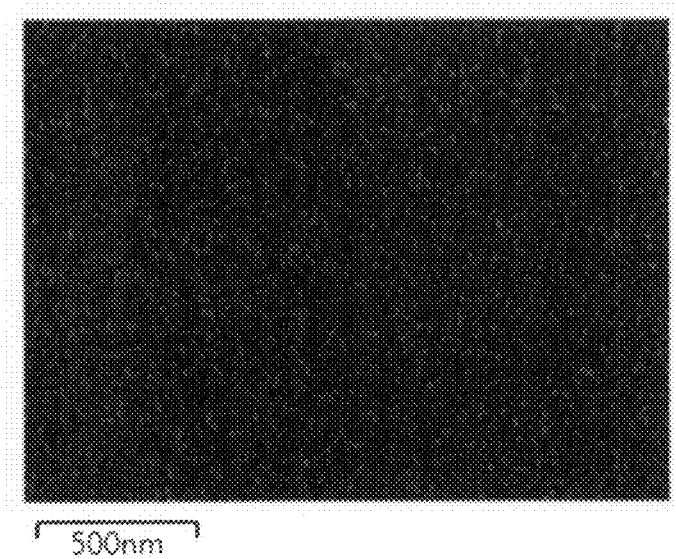
FIG. 25 shows a EDS layered image for sulfur of the hybrid particles prepared in Example (III).
Figure 26:
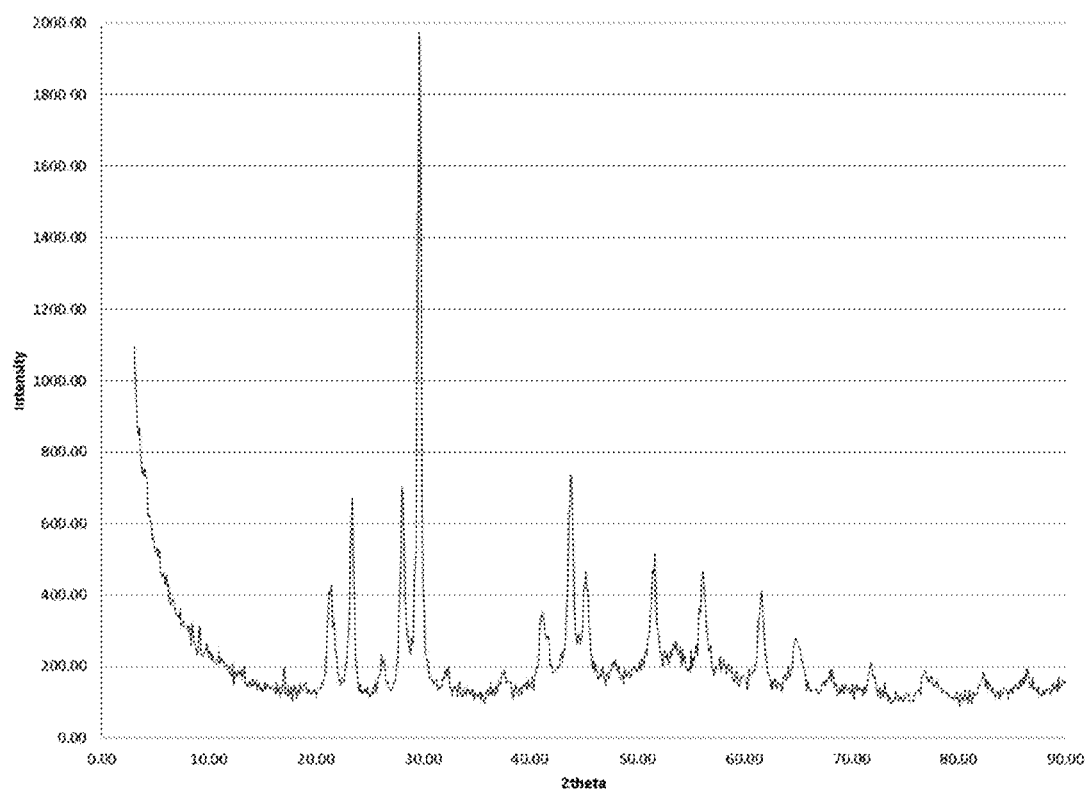
FIG. 26 shows a XRD analysis of the hybrid particles prepared in Example (III).
Figure 27:
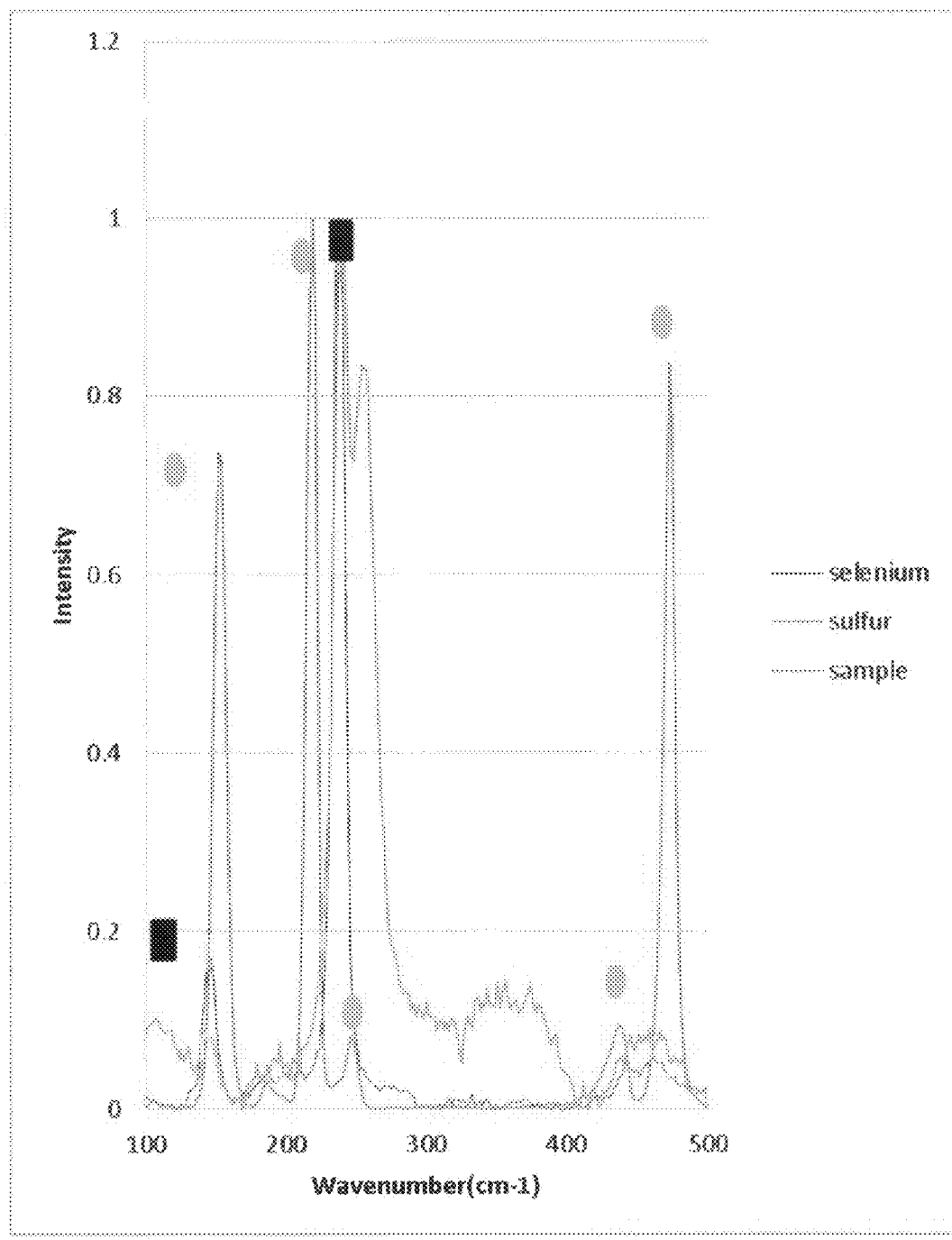
FIG. 27 shows a Raman spectrum of the hybrid particles prepared in Example (III).

FIG. 20 shows a SEM image of the hybrid particles obtained. FIG. 21 shows an EDS image of the hybrid particles and FIG. 22 shows a EDS layered image showing the distribution (color image) of S and Se in the hybrid particle. FIG. 23 shows a mapping of the sum of the wt % content of elements within the particles. FIGS. 24-25 (color images) show the individual image distribution for Se and S respectively. FIG. 26 shows a XRD spectrum of the hybrid particle (III) material and FIG. 27 shows a Raman spectrum of the hybrid particle (III) material.

The invention claimed is:

1. A hybrid particle, comprising:
a core of a hybrid composite consisting of at least two elements selected from the group consisting of sulfur, selenium and tellurium; and
a coating encapsulating the core;
wherein the coating comprises a first layer of a polymer having hydrophobic domains and hydrophilic domains with a hydrophobic domain closest to the hybrid material core, and
at least a second conductive polymer layer having an electrical charge opposite to the first layer, adjacent to and ionically bonded with the first layer.

2. The hybrid particle of claim 1, wherein
the core comprises elemental sulfur and elemental selenium,
a content of the sulfur is from greater than 50% to less than 100% by weight of the core, and
a content of the selenium is from greater than 0% to less than 50% by weight of the core.

3. The hybrid particle of claim 2, wherein
the content of the sulfur is from 90% to less than 100% by weight of the core, and
the content of the selenium is from greater than 0% to less than 10% by weight of the core.

4. The hybrid particle of claim 1, wherein
the core comprises elemental sulfur and elemental tellurium,
a content of the sulfur is from greater than 50% to less than 100% by weight of the core, and
a content of the tellurium is from greater than 0% to less than 50% by weight of the core.

5. The hybrid particle of claim 1 wherein a particle size of the core is from 0.01 micron to 1 micron.

6. The hybrid particle of claim 2 wherein the selenium is homogenously distributed with the elemental sulfur in the core.

7. The hybrid particle of claim 4 wherein the tellurium is homogenously distributed with the elemental sulfur in the core.

8. The particle of claim 1, wherein the coating comprises a layer of at least one polymer selected from the group consisting of poly(3,4-ethylenedioxythiophene) polystyrene sulfonate, polyvinylpyrrolidone, polyaniline, poly(ethylene oxide), carboxymethyl cellulose, sodium carboxymethylcellulose, polymethacrylic acid, [poly(2-acrylamido-2-methyl-1-propanesulfonic acid)], branched polyethylenimine, and poly(diallyldimethylammoniumchloride).

9. A method for preparing the particle of claim 1, comprising:
mixing an aqueous solution of a polymer having hydrophobic domains and hydrophilic domains with an aqueous solution of a soluble precursor of at least two elements selected from the group consisting of sulfur, selenium and tellurium to form a mixture;
adding an acid to the mixture to precipitate the hybrid material core close to a hydrophobic domain of the polymer as a first polymer layer; and
applying at least a second conductive polymer layer having an electrical charge opposite to the first layer adjacent to and ionically bonded with the first polymer layer.

10. The method of claim 9, wherein a soluble precursor of sulfur is present and the soluble precursor of sulfur is sodium thiosulfate.

11. The method of claim 9, wherein a soluble precursor of selenium is present and the soluble precursor of selenium is of formula (I):

$$Na_2SeSO_3 \qquad (I).$$

12. The method of claim 9, wherein a soluble precursor of tellurium is present and the soluble precursor of tellurium is of formula (II):

$$Na_2TeSO_3 \qquad (II).$$

13. The method of claim 9, wherein the acid is at least one selected from the group consisting of hydrochloric acid, oxalic acid, ascorbic acid, concentrated sulfuric acid, nitric acid, methanesulfonic acid and a mixture thereof.

14. A cathode comprising:
a conductive substrate, and
an active material comprising the hybrid particle of claim 1.

15. A battery, comprising:
an anode comprising a metal as an active source of metal ions;
the cathode of claim 14; and
an electrolyte interposed between the anode and cathode.

16. A vehicle, comprising the battery of claim 15.

* * * * *